US011427353B2

(12) United States Patent
Drolet et al.

(10) Patent No.: US 11,427,353 B2
(45) Date of Patent: Aug. 30, 2022

(54) SYSTEM AND METHOD FOR TESTING ENGINE PERFORMANCE IN-FLIGHT

(71) Applicant: PRATT & WHITNEY CANADA CORP., Longueuil (CA)

(72) Inventors: Martin Drolet, Saint-Amable (CA); Patrick Manoukian, Saint-Laurent (CA); Zachary Mounir Faty, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 266 days.

(21) Appl. No.: 16/713,273

(22) Filed: Dec. 13, 2019

(65) Prior Publication Data
US 2021/0179294 A1 Jun. 17, 2021

(51) Int. Cl.
*B64F 5/60* (2017.01)
*F02C 9/00* (2006.01)

(52) U.S. Cl.
CPC .................. *B64F 5/60* (2017.01); *F02C 9/00* (2013.01); *F05D 2260/80* (2013.01); *F05D 2270/13* (2013.01)

(58) Field of Classification Search
CPC ...... B64F 5/60; F02C 9/00; F02C 9/42; F05D 2260/80; F05D 2270/13; F05D 2220/329; F05D 2260/83
See application file for complete search history.

(56) References Cited

U.S. PATENT DOCUMENTS

| 5,018,069 A | * | 5/1991 | Pettigrew | ................. F02C 9/00 701/31.6 |
| 5,260,874 A | * | 11/1993 | Berner | ..................... G09B 9/24 434/242 |
| 6,138,081 A | * | 10/2000 | Olejack | ................. G01M 15/00 702/182 |
| 6,721,631 B2 | * | 4/2004 | Shimizu | .................. H04L 29/06 700/286 |
| 6,917,908 B2 | | 7/2005 | Williams | |
| 7,031,812 B1 | * | 4/2006 | Pettigrew | ................ B64C 27/06 701/14 |

(Continued)

FOREIGN PATENT DOCUMENTS

| CN | 104515683 A | 4/2015 |
| FR | 3064680 B1 | 4/2019 |

OTHER PUBLICATIONS

Search Report dated Apr. 30, 2021 in connection with corresponding EP application No. 20213801.2.

*Primary Examiner* — Mussa A Shaawat
(74) *Attorney, Agent, or Firm* — Norton Rose Fulbright Canada LLP

(57) ABSTRACT

Systems and Methods are described for testing engine performance in-flight in an aircraft having a first engine and a second engine. The method comprises operating the first engine at a first power level in an output speed governing mode, operating the second engine at a second power level greater than the first power level in a core speed governing mode concurrently with the first engine operating at the first power level in the output speed governing mode, and performing an engine performance test on the second engine while the second engine is at the second power level in the core speed governing mode.

19 Claims, 9 Drawing Sheets

(56) References Cited

U.S. PATENT DOCUMENTS

| | | | |
|---|---|---|---|
| 7,693,147 B2* | 4/2010 | Williams | H04L 69/329 709/227 |
| 7,714,702 B2* | 5/2010 | Khuzadi | G08B 21/04 340/425.5 |
| 7,769,521 B2* | 8/2010 | Gaulmin | F02C 9/42 701/99 |
| 8,068,997 B2 | 11/2011 | Ling et al. | |
| 8,161,806 B1* | 4/2012 | Weickert | F01D 17/24 73/112.01 |
| 8,666,568 B2 | 3/2014 | Camhi | |
| 8,682,509 B2* | 3/2014 | Goodrich | G05B 23/0283 701/14 |
| 8,700,363 B2 | 4/2014 | Heinzerling | |
| 8,909,453 B2* | 12/2014 | Wendelsdorf | B64C 27/04 701/99 |
| 9,051,055 B2 | 6/2015 | Schaeffer | |
| 9,081,935 B2 | 7/2015 | Heinzerling | |
| 9,221,535 B2 | 12/2015 | Gordon et al. | |
| 9,222,412 B2 | 12/2015 | Camhi et al. | |
| 9,355,571 B2 | 5/2016 | Rucci et al. | |
| 9,387,934 B2 | 7/2016 | Gomez | |
| 9,458,771 B2 | 10/2016 | Ling et al. | |
| 9,586,691 B2 | 3/2017 | Rossotto et al. | |
| 9,753,894 B2* | 9/2017 | Heinzerling | G06Q 10/06 |
| 9,790,864 B2* | 10/2017 | Skertic | G05B 23/0289 |
| 9,890,708 B2 | 2/2018 | Borchers et al. | |
| 9,944,404 B1* | 4/2018 | Gentry | G07C 5/0816 |
| 10,024,187 B2 | 7/2018 | Soares, Jr. et al. | |
| 10,048,168 B2 | 8/2018 | Armstrong et al. | |
| 10,144,528 B2 | 12/2018 | Rossotto | |
| 10,442,544 B2 | 10/2019 | Boyd et al. | |
| 2006/0283190 A1* | 12/2006 | Thomassin | G01M 15/14 60/772 |
| 2010/0057277 A1* | 3/2010 | Goodrich | G07C 5/0883 701/14 |
| 2011/0219862 A1* | 9/2011 | Sand | F02K 3/04 73/116.03 |
| 2014/0236534 A1* | 8/2014 | Ling | G01M 15/14 702/182 |
| 2014/0271114 A1* | 9/2014 | Phillips | G05B 19/048 415/1 |
| 2015/0330869 A1* | 11/2015 | Ziarno | G07C 5/0841 701/34.4 |
| 2015/0363981 A1* | 12/2015 | Ziarno | G07C 5/0841 701/101 |
| 2016/0236790 A1* | 8/2016 | Knapp | G08G 5/0052 |
| 2016/0347479 A1 | 12/2016 | O'Neil et al. | |
| 2017/0159574 A1 | 6/2017 | Paul et al. | |
| 2017/0241798 A1* | 8/2017 | Van Den Bergh | B64F 5/60 |
| 2017/0259942 A1* | 9/2017 | Ziarno | G05B 23/0283 |
| 2018/0201386 A1* | 7/2018 | Strauss | B64D 45/00 |
| 2018/0354646 A1 | 12/2018 | Nakhjavani | |
| 2019/0391047 A1* | 12/2019 | Bristow | B64C 21/02 |

* cited by examiner

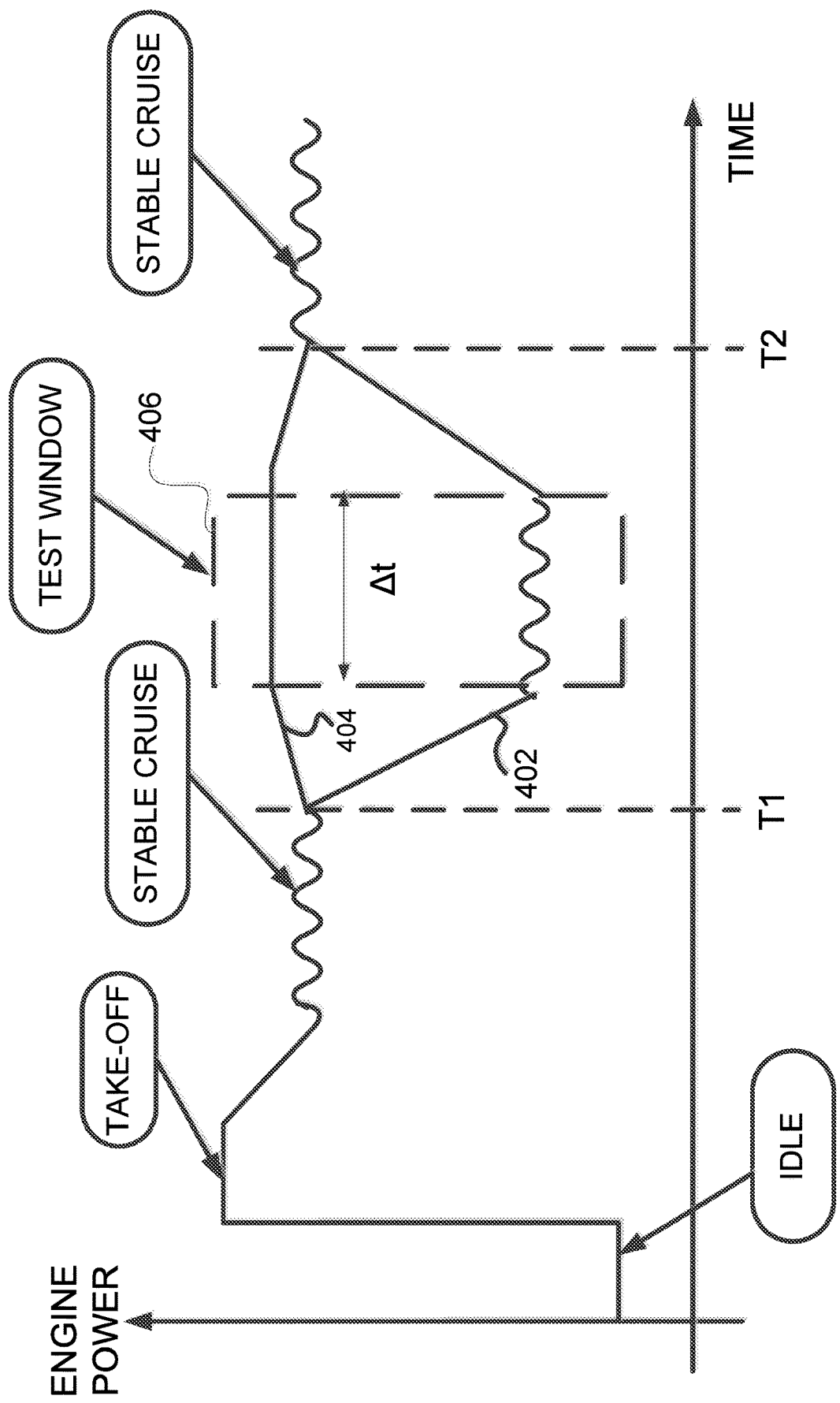

SYSTEM AND METHOD FOR TESTING ENGINE PERFORMANCE IN-FLIGHT

TECHNICAL FIELD

The present disclosure relates generally to gas turbine engines, and more particularly to testing engine performance of gas turbine engines.

BACKGROUND OF THE ART

Maintenance tests are run on a regular basis on gas turbine engines. Such tests are intended to determine how the engine's current performance compares with its performance when it was new or freshly overhauled. An Engine Power Assurance Check (EPAC) is performed in-flight, during stable engine operating conditions. Data is gathered and compared to prior data to assess the health of the engine. Improvements are desirable for ensuring long term health of engines.

SUMMARY

In accordance with a broad aspect, there is provided a method for testing engine performance in-flight in an aircraft having a first engine and a second engine. The method comprises operating the first engine at a first power level in an output speed governing mode, operating the second engine at a second power level greater than the first power level in a core speed governing mode concurrently with the first engine operating at the first power level in the output speed governing mode, and performing an engine performance test on the second engine while the second engine is at the second power level in the core speed governing mode.

In accordance with another broad aspect, there is provided a system for testing engine performance in-flight in an aircraft having a first engine and a second engine. The system comprises a processing unit and a non-transitory computer readable medium having stored thereon program code. The program code is executable by the processing unit for operating the first engine at a first power level in an output speed governing mode, operating the second engine at a second power level greater than the first power level in a core speed governing mode concurrently with the first engine operating at the first power level in the output speed governing mode, and performing an engine performance test on the second engine while the second engine is at the second power level in the core speed governing mode.

In accordance with yet another broad aspect, there is provided a non-transitory computer readable medium having stored thereon program instructions executable by a processing unit for testing engine performance in-flight in an aircraft having a first engine and a second engine. The program instructions are configured for operating the first engine at a first power level in an output speed governing mode, operating the second engine at a second power level greater than the first power level in a core speed governing mode concurrently with the first engine operating at the first power level in the output speed governing mode, and performing an engine performance test on the second engine while the second engine is at the second power level in the core speed governing mode.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 4A-4D are graphs illustrating various flight phases of an aircraft; and

It will be noted that throughout the appended drawings, like features are identified by like reference numerals.

DETAILED DESCRIPTION

Engine performance tests, such as Engine Power Assurance Checks (EPACs) are performed on a regular basis on gas turbine engines in order to monitor engine health and to validate available engine power. In order to obtain valid data, the engine undergoing an engine performance test in-flight must be operating in stable conditions. Such stable conditions are difficult to sustain throughout the duration of the test, as the engine and/or pilot may react to variations in flight conditions.

A proposed solution, applicable to aircraft having at least two engines, consists in using a first engine to allow a second engine the ability to maintain thermodynamic stability for the engine performance test, while maintaining the required combined engine power. The second engine is pushed to high power and discharged from governing responsibility for the output torque/speed control of the aircraft. The first engine is pushed to low power but high enough to maintain authority on the output torque/speed control of the aircraft. The second engine is in engine core speed (Ng or Nh) governing mode for the duration of the test, while the first engine is in output speed governing mode.

Figure 1A:
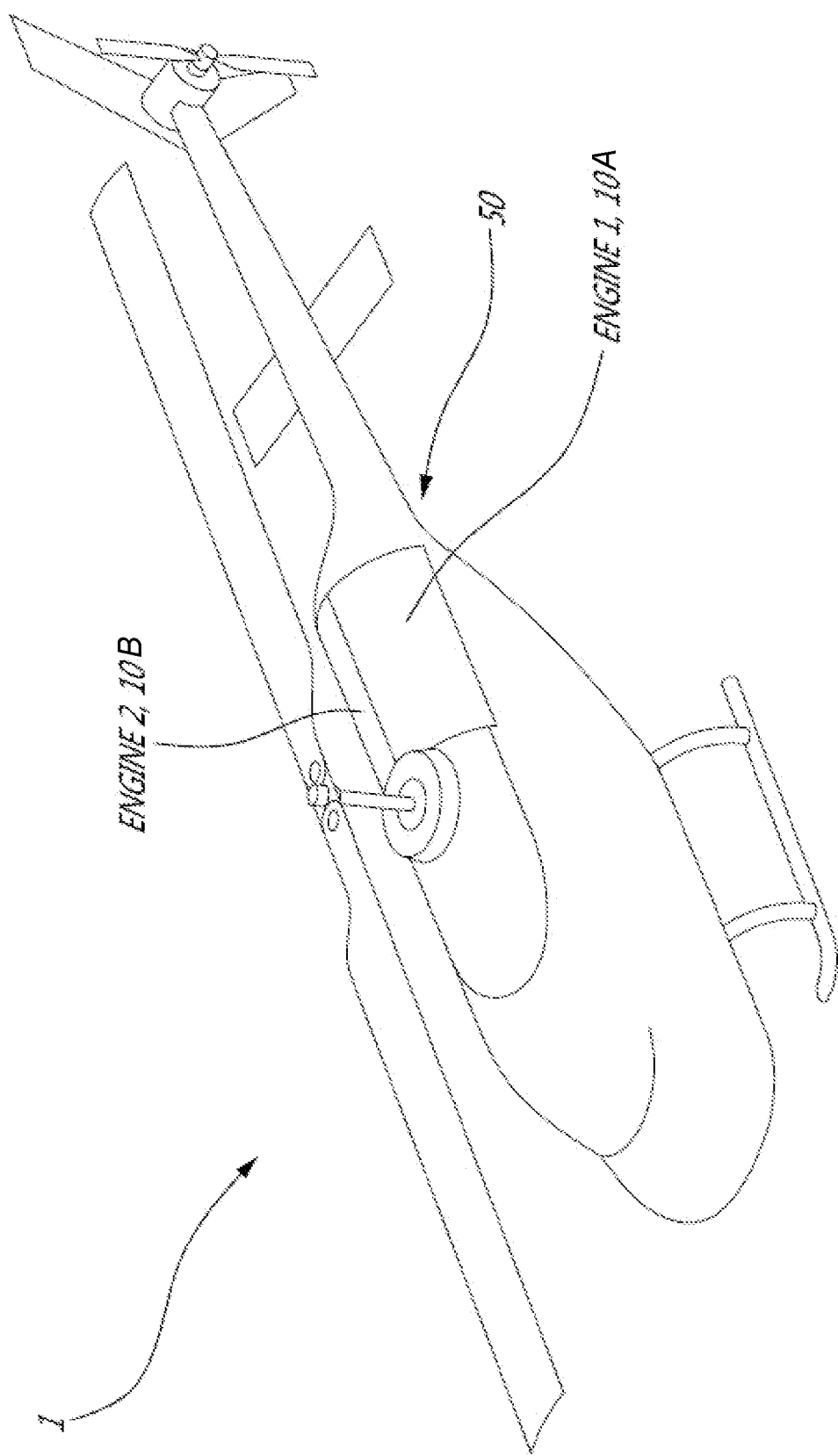
FIG. 1A is a schematic view of an exemplary multi-engine aircraft.

FIG. 1A depicts an exemplary multi-engine aircraft 1, which in this case is a helicopter. The aircraft 1 may however also be a fixed-wing aircraft. The aircraft 1 includes at least two gas turbine engines 10A, 10B, labeled in FIG. 1A as "ENGINE 1" and "ENGINE 2", respectively. These two engines may be interconnected, in the case of the depicted helicopter application, by a common gearbox to form a multi-engine system 50 as shown in FIG. 1B.

Figure 1B:
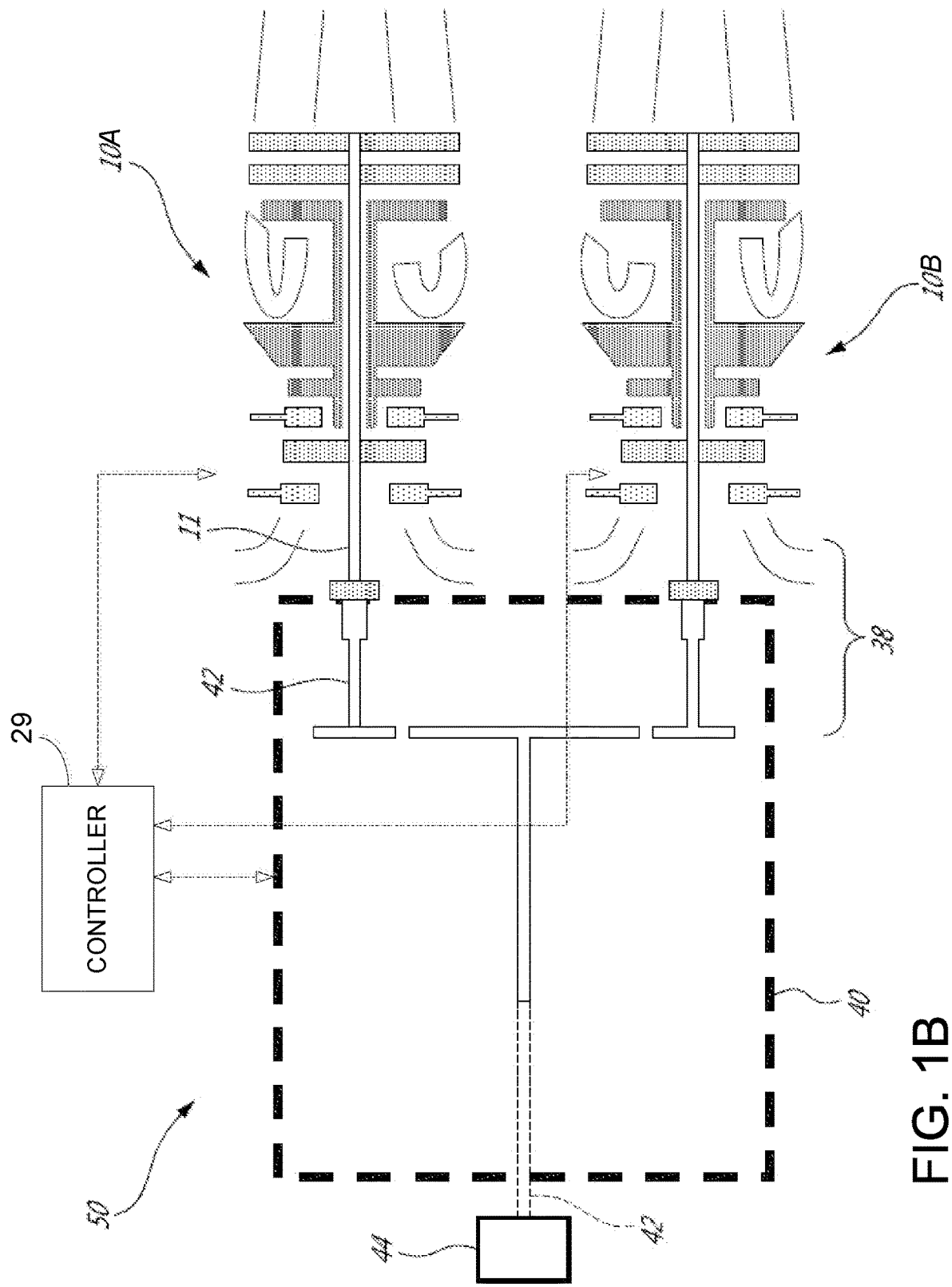
FIG. 1B is a schematic representation of an exemplary multi-engine system for the aircraft of FIG. 1A, showing axial cross-sectional views of two gas turbine engines.

FIG. 1B illustrates a schematic representation of an exemplary multi-engine system 50 that may be used as a power plant for the aircraft 1. The multi-engine system 50 comprises two or more gas turbine engines 10A, 10B. The multi-engine system 50 may manage the operation of the engines 10A, 10B, as will be described in further detail below. The multi-engine system 50 may be used as a dual engine power plant for an aircraft, such as a helicopter. In addition to airborne applications, the multi-engine system 50 may be used in marine and/or industrial applications.

More particularly, the multi-engine system 50 of this embodiment includes first and second engines 10A, 10B each having a respective transmission 38 which are interconnected by a common output gearbox 40 to drive a common load 44. In one embodiment, the common load 44 may comprise a rotary wing of a rotary-wing aircraft. For example, the common load 44 may be a main rotor of a helicopter. Depending on the type of the common load 44 and on the operating speed thereof, each of engines 10A, 10B may be drivingly coupled to the common load 44 via the output gearbox 40, which may be of the speed-reduction type.

For example, the gear box 40 may have a plurality of transmission shafts 42 to receive mechanical energy from respective output shafts 11 of respective engines 10A, 10B. The gear box 40 may be configured to direct at least some of the combined mechanical energy from the plurality of the engines 10A, 10B toward a common output shaft 42 for driving the common load 44 at a suitable operating (e.g., rotational) speed. It is understood that the multi-engine system 50 may also be configured, for example, to drive accessories and/or other elements of an associated aircraft 1. As will be described, the gear box 40 may be configured to permit the common load 44 to be driven by either of the engines 10A, 10B or, by a combination of both engines 10A, 10B together.

Control of the multi-engine system 50 is effected by one or more controller(s) 29, which may be FADEC(s), electronic engine controller(s) (EEC(s)), electronic control units(s) (ECU(s)) or the like, that are programmed to manage, as described herein below, the operation of the engines 10A, 10B to reduce an overall fuel burn while maintaining requested power, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the multi-engine system 50. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 10A, 10B of the system 50 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a lower-power (which could be no power, in some cases) "standby mode" while the other engine is operated in a high-power "active" mode. Such an asymmetric operating regime is engaged for a cruise phase of flight (continuous, steady-state flight which is typically at a given commanded constant aircraft cruising speed and altitude). The multi-engine system 50 may be used in an aircraft, such as a helicopter, but also has applications in suitable marine and/or industrial applications or other ground operations.

Referring still to FIG. 1B, according to the present description the multi-engine system 50 is driving in this example an aircraft 1 which may be operated in this asymmetric manner, in which a first of the turboshaft engines (say, 10A) may be operated in a low-power (which could be no power, in some cases) standby mode and the second of the turboshaft engines (10B in this example) may be operated at high power in an active mode. In one example, the first turboshaft engine 10A may be controlled by the controller(s) 29 to operate at low-power or no-output-power conditions to supply substantially none or none of a required power and/or speed demand of the common load 44. The second turboshaft engine 10B may be controlled by the controller(s) 29 to run at full (or near-full) power conditions in the active mode, to supply substantially all or all of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B.

In another example, an asymmetric operating regime of the engines may be achieved through the differential control of fuel flow to the engines via one or more controller 29, as described in pending application Ser. No. 16/535,256, the entire contents of which are incorporated herein by reference. Low fuel flow may also include zero fuel flow in some examples.

Although various differential control between the engines of the engine system 50 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric operating regime, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine (say 10A) of the multiengine system 50 in a standby mode at a power substantially lower than a rated cruise power level of the engine, and in some embodiments at substantially zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 50 of FIG. 1B may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines 10A, 10B, the asymmetric operating regime is applicable to more than two engines, whereby at least one of the multiple engines is operated in a low-power standby mode while the remaining engines are operated in the active mode to supply all or substantially all of a required power and/or speed demand of a common load.

In use, the first engine (say 10A) may operate in the standby mode while the other engine (say 10B) may operate in the active mode, as described above. During operation in the asymmetric operating regime, if the aircraft 1 needs a power increase (expected or otherwise), the first engine 10A may be required to provide more power relative to the low power conditions of the standby mode, and possibly return immediately to a high- or full-power condition. This may occur, for example, in an emergency condition of the multi-engine system 50 powering the helicopter, wherein the "active" engine loses power and power recovery from the lower power to the high power may take some time. Even absent an emergency, it will be desirable to repower the standby engine to exit the asymmetric operating regime.

Figure 2:
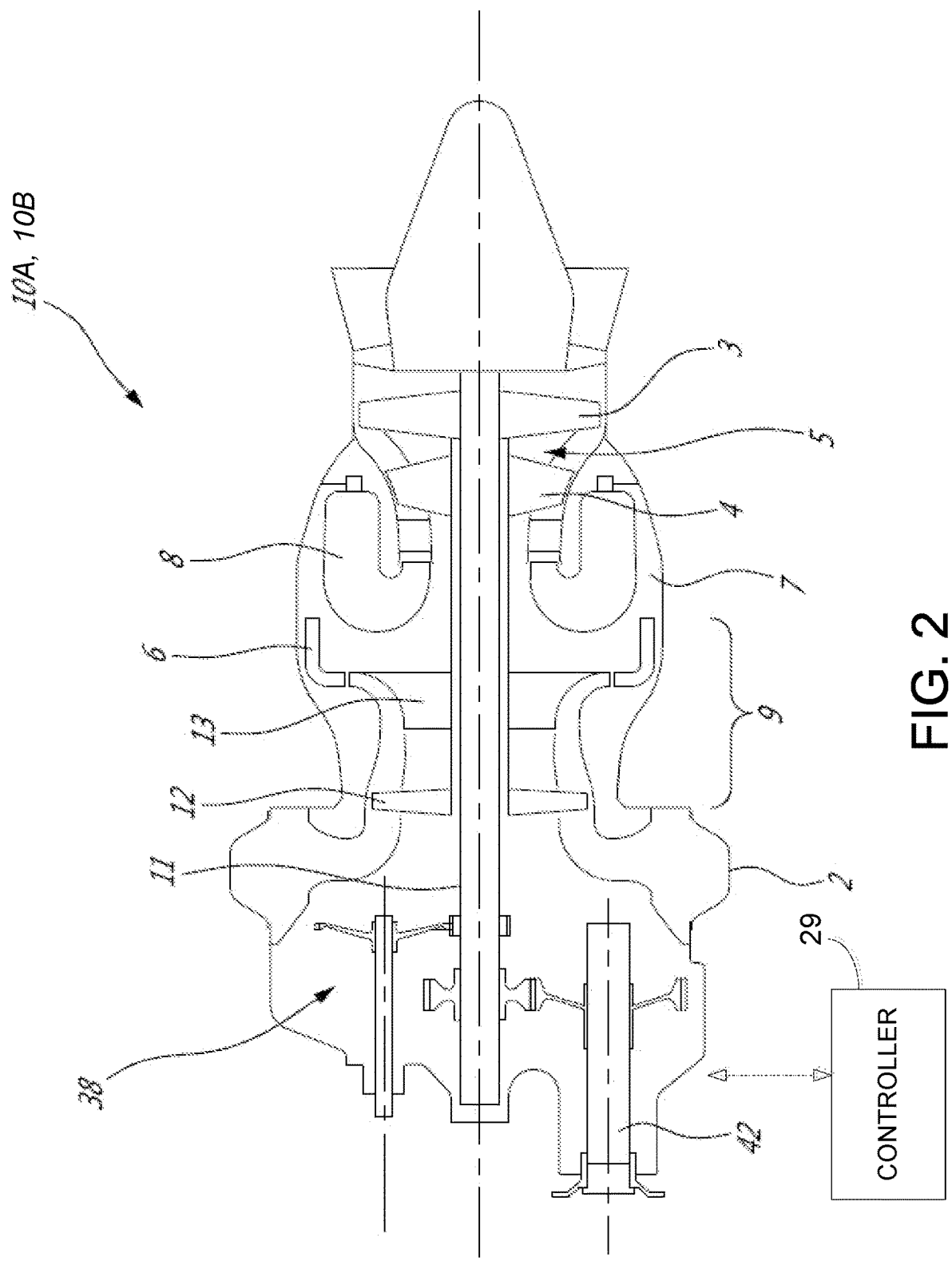
FIG. 2 is a schematic axial cross-sectional view of one of the gas turbine engines of FIG. 1B, for the multi-engine aircraft of FIG. 1A.

Referring now to FIG. 2, the gas turbine engine, 10A or 10B, is of a type provided, in one embodiment, for use in subsonic flight, generally comprising in serial flow communication a compressor section 9 for pressurizing the air, a combustor 8 in which the compressed air is mixed with fuel and ignited for generating an annular stream of hot combustion gases, and a turbine section 5 for extracting energy from the combustion gases. Engines 10A and 10B may be of a same or different configuration.

The engine 10A or 10B depicted in FIG. 2 is a turboshaft gas turbine engine, and therefore includes a reduction gearbox and transmission 38 with an output shaft 42 which is configured to provide power output from the engine 10A to the common aircraft gearbox 40 of the multi-engine system 50 of FIG. 1B. However, it is to be understood that the present disclosure may also be applicable to other types of gas turbine engines, including turboprops and turbofans for example.

Referring still to FIG. 2, the gas turbine engine 10A or 10B includes an air inlet 2 via which air enters the engine 10A or 10B before being directed into the compressor section 9 of the engine. In the depicted embodiment, the compressor section 9 includes a low-pressure axial compressor 12 and a high-pressure centrifugal compressor 13. Compressed air exits the high pressure compressor 13 through a diffuser 6 and is contained within a plenum 7 that surrounds the combustor 8. Fuel is supplied to the combustor 8 through fuel nozzles fed by a fuel system, wherein the injected fuel from the fuel nozzles is mixed with the compressed air within the combustor 8 thereby causing the fuel-air mixture to be ignited within the combustion chamber. A portion of the compressed air within the plenum 7 is therefore admitted into the combustor 8 through orifices in the side walls to create a cooling air curtain along the combustor walls. A portion of the compressed air is also used as bleed air for pneumatic systems within and/or external to the engine. The annular stream of hot combustion gases exiting the combustor 8 is directed to a downstream turbine section 5 for extracting energy from the combustion gases before exiting the engine as exhaust. The turbine section 5 may include one or more turbine rotors. In the embodiment of FIG. 2, a high pressure turbine 4 drives a high pressure engine shaft to which both the low and high pressure compressors 12 and 13 are connected for driving same, and a low pressure turbine 3 drives a low pressure turbine shaft which is coaxial with the low pressure engine shaft and drives the power output shaft 11, and the gearbox 38, of the engine 10A or 10B.

Figure 3:
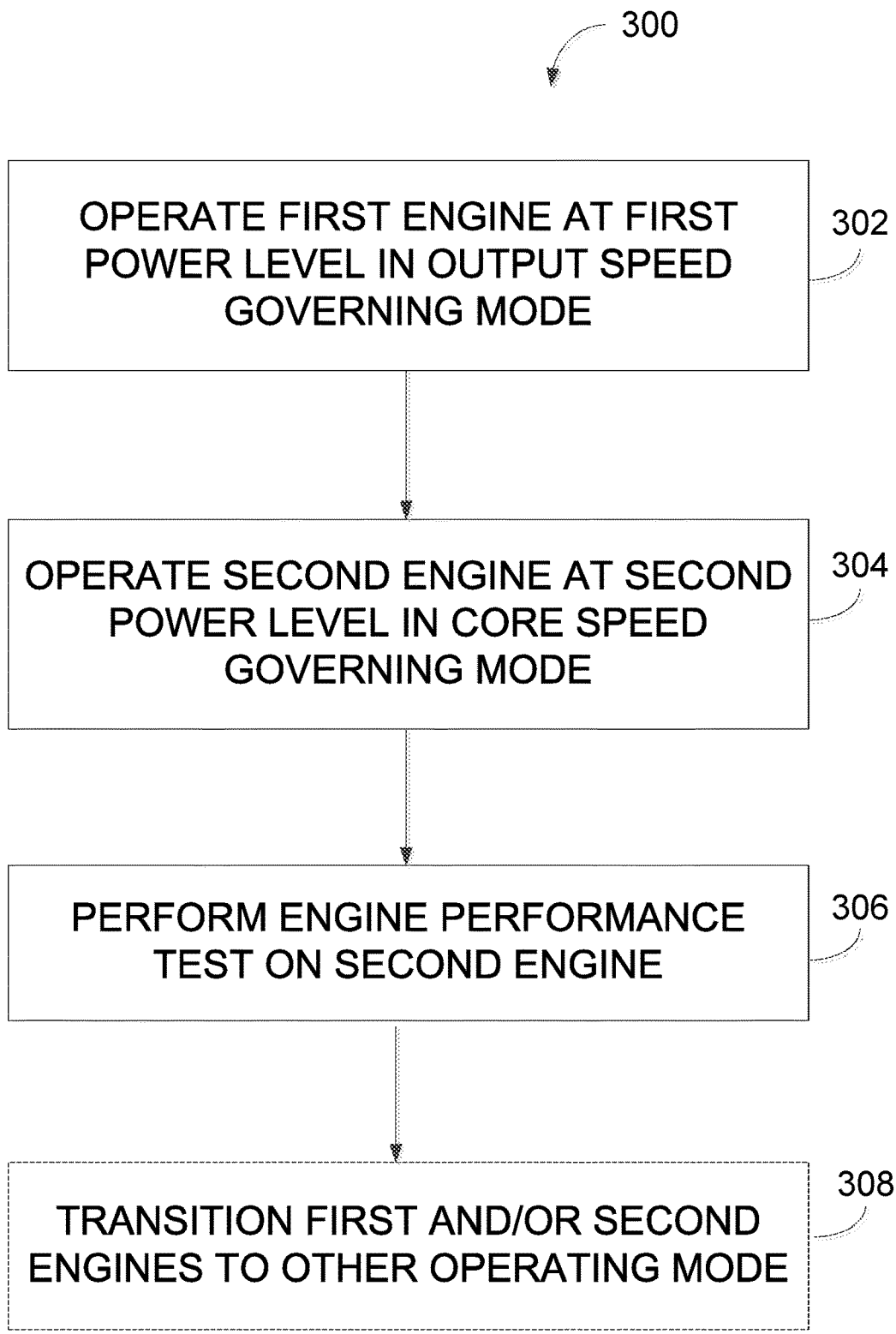
FIG. 3 is a flowchart of an example method for testing engine performance in-flight.

A power split may be induced between the two engines 10A, 10B in order to allow an engine performance test to be performed on one of the two engines 10A, 10B. Referring to FIG. 3, there is illustrated a flowchart of a method 300 for testing engine performance in-flight in an aircraft having a first engine and a second engine, such as aircraft 1 having engines 10A, 10B. At step 302, the first engine 10A is operated at a first power level in an output speed governing mode. The first power level is as low as possible while being high enough to maintain authority on the output torque/speed control. The output speed governing mode refers to the ability of the engine to have such authority, and to control the main rotor speed of the aircraft 1.

At step 304, the second engine is operated at a second power level. The second power level is greater than the first power level, and in some cases as high as possible without interfering with the first engine's ability to control the main rotor speed of the aircraft 1. In some embodiments, the second power level corresponds to a value on or near a design point of the engine. While operating at the second power level, the second engine is discharged from its authority on main rotor speed and placed into core speed governing mode. The engine core refers to the compressor 13, combustor 8, and turbine 5, and is also known as the gas generator. Core speed governing mode thus refers to a mode of governing where fuel is controlled to the engine as a function of a target rotational speed of the engine core, instead of as a function of a target output speed (as it would be in output speed governing mode). When in core speed governing mode, the engine has more thermodynamic stability as it is not subject to changes caused by varying operating conditions.

At step 306, an engine performance test is performed on the second engine while the second engine is at the second power level in core speed governing mode and the first engine is at the first power level in output speed governing mode. It will be understood that steps 302 and 304 may be performed sequentially in any order or concurrently. Step 306 may be performed once both engines are at their respective first and second power levels. The engine performance test involves recording various engine and/or aircraft flight characteristics for a duration of time Δt, which is determined so as to obtain a representative number of data samples from the engine. The second engine remains stable for the duration of the test.

Figure 4A:
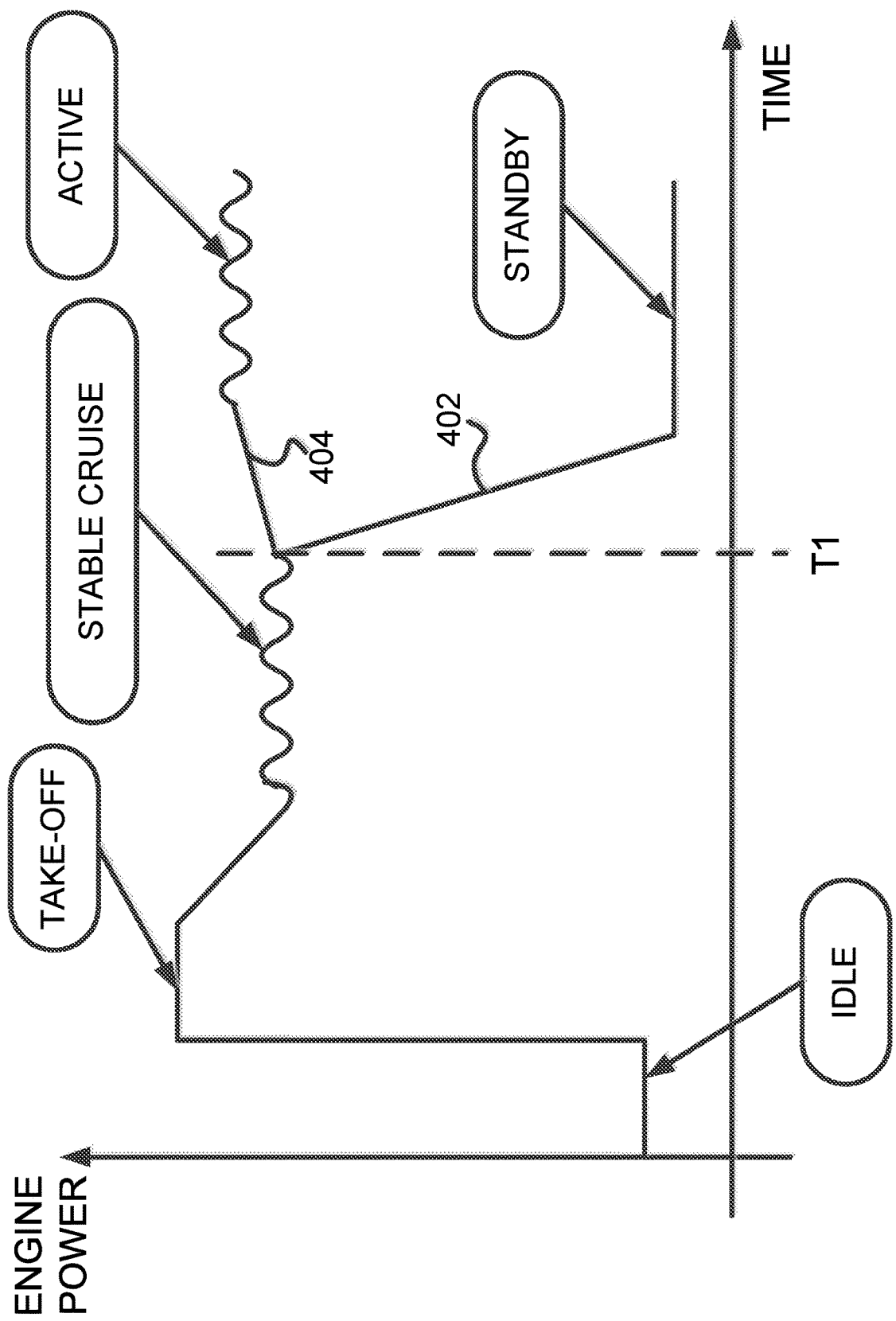

The method 300 may be performed at various phases of flight of an aircraft. Referring to FIG. 4A, there is illustrated an example of power levels for the first engine 10A and the second engine 10B through certain phases of flight. In the example, the engines 10A, 10B start at idle, as they would be when the aircraft 1 is on the ground. The power level of both engines 10A, 10B increases significantly from idle for take-off, and decreases as the engines 10A, 10B transition into a stable cruise mode. At time T1, the power levels for the engines 10A, 10B begin to differ, as the engines enter an asymmetric operating regime. The first engine 10A, represented by curve 402, enters a standby mode. The second engine 10B, represented by curve 404, enters an active mode.

Figure 4B:
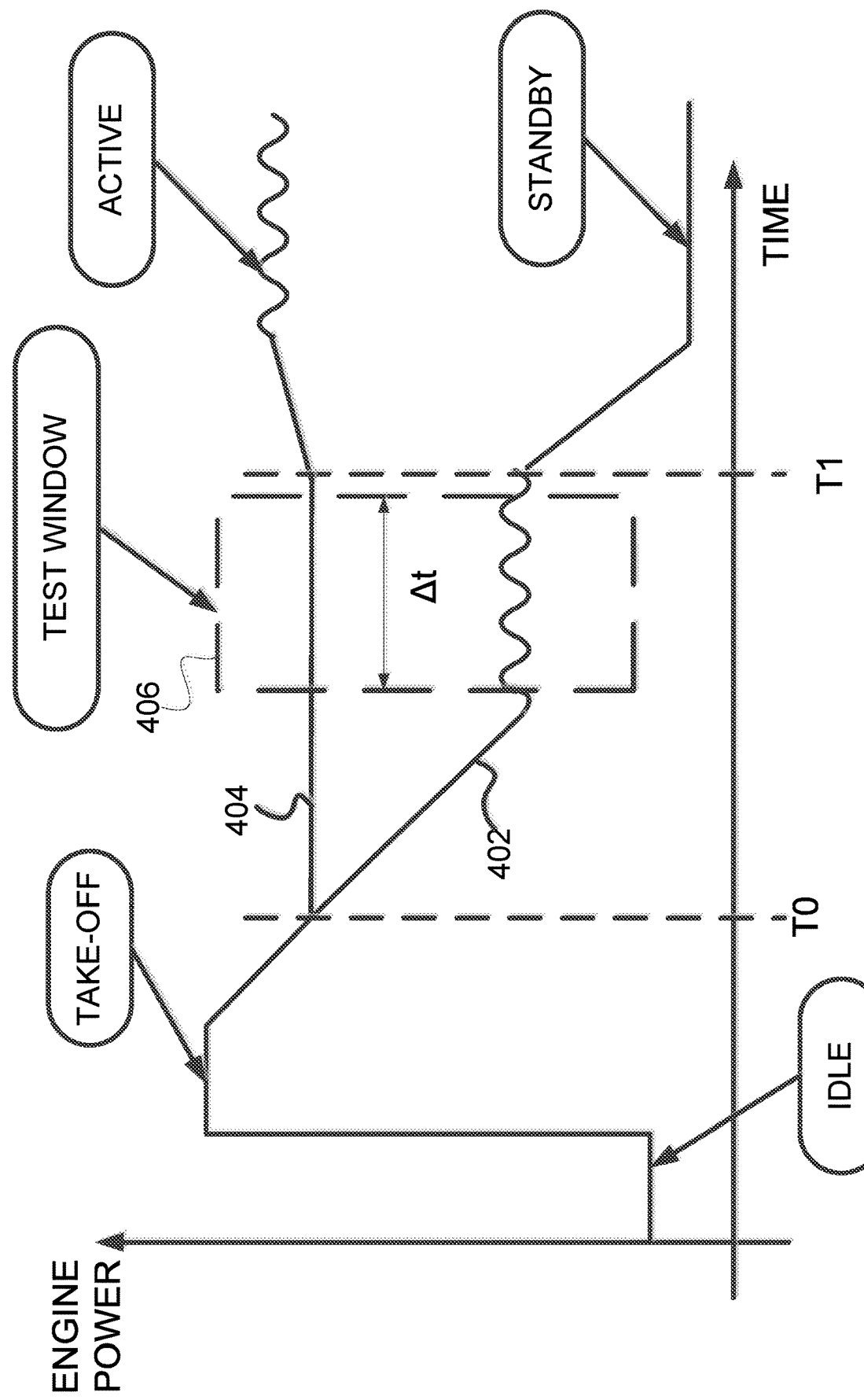

In some embodiments, the method 300 is applied as the engines 10A, 10B transition from takeoff into the asymmetric operating regime. An example is illustrated in FIG. 4B. At time T0, the power split between the first engine and the second engine is induced, and steps 302, 304 of the method 300 are performed to bring the first engine and the second engine to the first and second power levels, in their respective governing modes. The first engine is subject to varying flight conditions, as illustrated by the wavy portion of curve 402, while the second engine is not. Step 306 of the method 300 may be performed during the test window 406 of duration Δt. At time T1, the power level of the first engine is lowered (curve 402) and the power level of the second engine is increased (curve 404). The first engine is operated in a standby mode to provide substantially no motive power to the aircraft and the second engine is operated in an active mode to provide motive power to the aircraft. The second engine transitions out of core speed governing mode and into output speed governing mode.

Figure 4C:
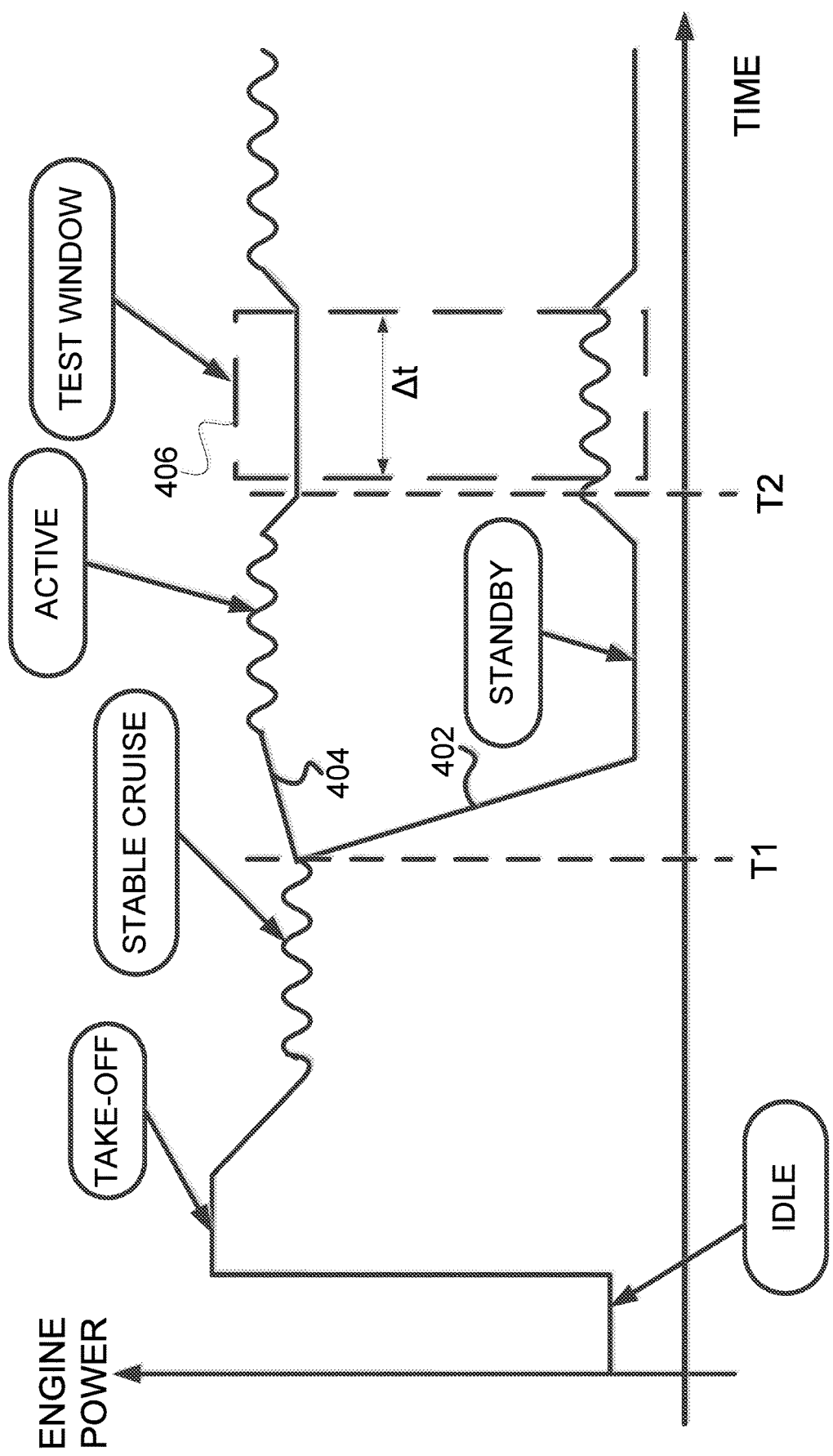

In some embodiments, the method 300 is applied while the engines 10A, 10B are in the asymmetric operating regime. An example is shown in FIG. 4C. As shown, the first and second engines enter the asymmetric operating regime at time T1. At time T2, the power level of the first engine is increased from a level suitable for standby mode to a level suitable for governing the output speed of the main rotor of the aircraft. Also at time T2, the power level of the second engine is decreased slightly, and authority for output speed governing is removed therefrom. Step 306 of the method 300 may be performed during the test window 406 of duration Δt, after which the first and second engines are returned to standby and active mode power levels, respectively.

As shown in FIGS. 4B and 4C, the method 300 may be applied prior to entering the asymmetric operating regime as well as after having entered the asymmetric operating regime. In addition, the method 300 may be applied in circumstances where the engines are not operated in the asymmetric operating regime. An example is illustrated in FIG. 4D. The first and second engines are transitioned from take-off to stable cruise power levels. At time T1, a power split is induced between the first and second engines, through the application of steps 302, 304 of the method 300. Step 306 may be performed during the test window 406 of duration Δt, after which the first and second engines are brought back to a common stable cruise power level by time T2.

In some embodiments, steps 302 and 304 of operating the first and second engines at the first and second power levels, respectively, comprises decreasing the first engine to the first power level and decreasing the second engine to the second power level. This can occur, for example, as the aircraft transitions out of a take-off phase.

In some embodiments, steps 302 and 304 of operating the first and second engines at the first and second power levels, respectively, comprise decreasing the first engine to the first power level and increasing the second engine to the second power level. This can occur, for example, when the method 300 is applied while the first and second engines are both operating at a stable cruise power level. Depending on the power level for stable cruise, the first engine may be decreased by an amount significantly greater than the amount by which the second engine is increased, as illustrated in the example of FIG. 4D.

In some embodiments, steps 302 and 304 of operating the first and second engines at the first and second power levels, respectively, comprise increasing the first engine to the first power level and decreasing the second engine to the second power level. This can occur, for example, when the method 300 is applied while the first and second engines are in the asymmetric operating regime.

Other embodiments as to when the method 300 may be applied are also considered. For example, the method 300 may be applied in the transition from take-off to stable cruise. Different power levels may be used for the first and second power levels, depending on the initial power levels of the first and second engines prior to applying the method 300. For example, the power split between the first and second engines may be greater when the method 300 is applied from the asymmetric operating regime than when the method 300 is applied from stable cruise.

The method 300 may be applied multiple times throughout a flight, at planned intervals, during the asymmetric operating regime and/or during stable cruise. The duration of the test may vary from one instance to the next, as a function of one or more parameter such as operating conditions, mission, flight phase, and the like. The duration of the test may be fixed for each instance of the test but may vary from flight to flight. For example, the duration may vary as a function of how many times the test is performed throughout the flight. If the test is performed a greater number of times, the duration of each test may be shorter than if the test is performed less often. Each test can be reviewed independently or combined to assess the performance of the engine.

In some embodiments, the method 300 further comprises a step 308 of transitioning the first and/or second engine to another operating mode and/or power level after the engine performance test is completed. For example, the first and second engines may be transitioned to the asymmetric operating regime, as shown in the example of FIG. 4B, or the first and second engines may be transitioned to a stable cruise power level, as shown in the example of FIG. 4D. Various other embodiments may also apply, depending on factors such as operating conditions, mission, flight duration, and the like. In some embodiments, transitioning the first and/or second engine as per step 308 comprises determining current operating conditions of the aircraft and/or engine(s) after the engine performance test and selecting a power level for each engine as a function of the current operating conditions.

In some embodiments, the method 300 may be triggered automatically. For example, the controller 29 may include control logic configured to trigger the method 300 under certain circumstances, such as flight phase, operating conditions, and the like. In some embodiments, the method 300 may be triggered manually. For example, the controller 29 may include control logic configured to trigger the method in response to a pilot or other operator input. Other embodiments may also apply.

In some embodiments, the first engine is designed to operate at very low power and the second engine is designed to operate at very high power. Alternatively, the first and second engines are substantially similar and the role of high power and low power engine may be interchangeable.

Figure 5:
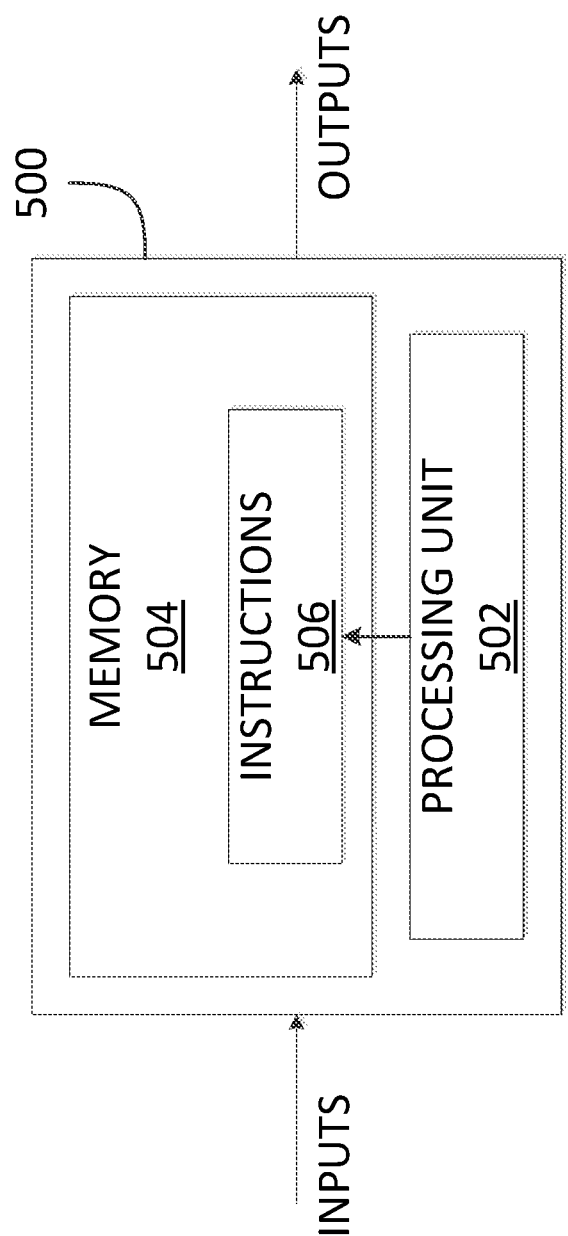
FIG. 5 is a block diagram of an example computing device.

With reference to FIG. 5, an example of a computing device 500 is illustrated. The controller 29 may be implemented with one or more computing devices 500. Note that the controller 29 can be implemented as part of a full-authority digital engine controls (FADEC) or other similar device, including electronic engine control (EEC), engine control unit (ECU), electronic propeller control, propeller control unit, and the like. In some embodiments, the controller 29 is implemented as a Flight Data Acquisition Storage and Transmission system, such as a FAST™ system. The controller 29 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method 300 such that instructions 506, when executed by the computing device 500 or other programmable apparatus, may cause the functions/acts/steps performed as part of the method 300 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for testing engine performance in-flight described herein may be implemented in a high level procedural or object oriented programming or scripting language, or a combination thereof, to communicate with or assist in the operation of a computer system, for example the computing device 500. Alternatively, the methods and systems for testing engine performance in-flight may be implemented in assembly or machine language. The language may be a compiled or interpreted language. Program code for implementing the methods and systems for testing engine performance in-flight may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for testing engine performance in-flight may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, various combinations of the software and/or hardware components described herein may be used. Yet further modifications could be implemented by a person of ordinary skill in the art in view of the present disclosure, which modifications would be within the scope of the present technology.

The invention claimed is:

1. A method for testing engine performance in-flight in a rotary-wing aircraft having a first engine and a second engine both drivingly engaged to a rotary wing of the rotary-wing aircraft, the method comprising:
   operating the first engine at a first power level in an output speed governing mode to govern a speed of the rotary wing;
   operating the second engine at a second power level greater than the first power level in a core speed governing mode to govern a speed of a core of the second engine, the second engine being operated at the second power level in the core speed governing mode concurrently with the first engine operating at the first power level in the output speed governing mode; and
   performing an engine performance test on the second engine while the second engine is operating at the second power level in the core speed governing mode and while the first engine is operating at the first power level in the output speed governing mode.

2. The method of claim 1, wherein operating the first engine at the first power level and operating the second engine at the second power level comprises decreasing the first engine to the first power level and decreasing the second engine to the second power level.

3. The method of claim 1, further comprising transitioning the first engine and the second engine to an asymmetric operating regime after the engine performance test, wherein the asymmetric operating regime comprises having the second engine in an active mode to provide motive power to the rotary wing and the first engine in a standby mode to provide substantially no motive power to the rotary wing.

4. The method of claim 1, wherein operating the first engine at the first power level and operating the second engine at the second power level comprises transitioning the first engine and the second engine out of an asymmetric operating regime where the second engine is in an active mode to provide motive power to the rotary wing and the first engine is in a standby mode to provide substantially no motive power to the rotary wing.

5. The method of claim 4, wherein transitioning out of the asymmetric operating regime comprises increasing the first engine to the first power level and decreasing the second engine to the second power level.

6. The method of claim 1, wherein operating the first engine at the first power level and operating the second engine at the second power level comprises decreasing the first engine to the first power level and increasing the second engine to the second power level.

7. The method of claim 1, wherein the method is performed at planned intervals throughout a flight of the rotary-wing aircraft.

8. The method of claim 1, further comprising transitioning the first engine and the second engine to a stable cruise power level after the engine performance test.

9. The method of claim 1, further comprising:
   determining operating conditions of the rotary-wing aircraft after the engine performance test; and
   operating the first engine and the second engine as a function of the operating conditions.

10. A system for testing engine performance in-flight in a rotary-wing aircraft having a first engine and a second engine both drivingly engaged to a rotary wing of the rotary-wing aircraft, the system comprising:
   a processing unit; and
   a non-transitory computer readable medium having stored thereon program code executable by the processing unit for:
      operating the first engine at a first power level in an output speed governing mode to govern a speed of the rotary wing;
      operating the second engine at a second power level greater than the first power level in a core speed governing mode to govern a speed of a core of the second engine, the second engine being operated at the second power level in the core speed governing mode concurrently with the first engine operating at the first power level in the output speed governing mode; and
      performing an engine performance test on the second engine while the second engine is operating at the second power level in the core speed governing mode and while the first engine is operating at the first power level in the output speed governing mode.

11. The system of claim 10, wherein operating the first engine at the first power level and operating the second engine at the second power level comprises decreasing the first engine to the first power level and decreasing the second engine to the second power level.

12. The system of claim 10, wherein the program code is further executable for transitioning the first engine and the second engine to an asymmetric operating regime after the engine performance test, wherein the asymmetric operating regime comprises having the second engine in an active mode to provide motive power to rotary wing and the first engine in a standby mode to provide substantially no motive power to the rotary wing.

13. The system of claim 10, wherein operating the first engine at the first power level and operating the second engine at the second power level comprises transitioning the first engine and the second engine out of an asymmetric operating regime where the second engine is in an active mode to provide motive power to the rotary wing and the first engine is in a standby mode to provide substantially no motive power to the rotary wing.

14. The system of claim 13, wherein transitioning out of the asymmetric operating regime comprises increasing the first engine to the first power level and decreasing the second engine to the second power level.

15. The system of claim 10, wherein operating the first engine at the first power level and operating the second engine at the second power level comprises decreasing the first engine to the first power level and increasing the second engine to the second power level.

16. The system of claim 10, wherein the engine performance test is repeated at planned intervals throughout a flight of the rotary-wing aircraft.

17. The system of claim 10, wherein the program code is further executable for transitioning the first engine and the second engine to a stable cruise power level after the engine performance test.

18. The system of claim 10, wherein the program code is further executable for:
   determining operating conditions of the rotary-wing aircraft after the engine performance test; and
   operating the first engine and the second engine as a function of the operating conditions.

19. A non-transitory computer readable medium having stored thereon program instructions executable by a processing unit for testing engine performance in-flight in a rotary-wing aircraft having a first engine and a second engine both drivingly engaged to a rotary wing of the rotary-wing aircraft, the program instructions configured for:
   operating the first engine at a first power level in an output speed governing mode to govern a speed of the rotary wing;
   operating the second engine at a second power level greater than the first power level in a core speed governing mode concurrently with the first engine operating at the first power level in the output speed governing mode to govern a speed of a core of the second engine, the second engine being operated at the second power level in the core speed governing mode; and
   performing an engine performance test on the second engine while the second engine is operating at the second power level in the core speed governing mode and while the first engine is operating at the first power level in the output speed governing mode.

* * * * *